(12) United States Patent
Li et al.

(10) Patent No.: US 8,737,340 B2
(45) Date of Patent: May 27, 2014

(54) POWER CONTROL METHOD AND BASE STATION

(75) Inventors: Changzhu Li, Shenzhen (CN); Han Bu, Shenzhen (CN); Ningwei Zhang, Shenzhen (CN); Jun Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 131 days.

(21) Appl. No.: 13/548,135

(22) Filed: Jul. 12, 2012

(65) Prior Publication Data

US 2012/0275425 A1  Nov. 1, 2012

Related U.S. Application Data

(63) Continuation of application No. PCT/CN2011/081902, filed on Nov. 8, 2011.

(30) Foreign Application Priority Data

Nov. 26, 2010  (CN) .......................... 2010 1 0561679

(51) Int. Cl.
*H04W 52/32* (2009.01)

(52) U.S. Cl.
CPC ................................. *H04W 52/325* (2013.01)
USPC ........................................................ 370/329

(58) Field of Classification Search
CPC ..... H04W 52/04; H04W 52/16; H04W 52/20; H04W 52/24; H04W 52/241; H04W 52/243; H04W 52/281; H04W 52/325
USPC .................. 370/311, 318, 328, 329
See application file for complete search history.

(56) References Cited

U.S. PATENT DOCUMENTS

| | | | |
|---|---|---|---|
| 2009/0285158 A1* | 11/2009 | Rezaiifar et al. | 370/328 |
| 2010/0254292 A1 | 10/2010 | Kim et al. | |
| 2010/0265882 A1* | 10/2010 | Nagata et al. | 370/328 |
| 2011/0098076 A1* | 4/2011 | Kim et al. | 455/522 |
| 2011/0183702 A1* | 7/2011 | Weaver et al. | 455/522 |
| 2011/0268048 A1* | 11/2011 | Toskala et al. | 370/329 |

FOREIGN PATENT DOCUMENTS

| | | |
|---|---|---|
| CN | 101466138 A | 6/2009 |
| CN | 101741437 A | 6/2010 |
| CN | 101877906 A | 11/2010 |
| CN | 102143568 A | 8/2011 |
| EP | 2312899 A1 | 4/2011 |
| WO | WO 2008/109162 A2 | 9/2008 |
| WO | WO 2010/016261 A1 | 2/2010 |
| WO | WO 2010/075733 A1 | 7/2010 |
| WO | WO 2011/144011 A1 | 11/2011 |

OTHER PUBLICATIONS

International Search Report and translation received in Patent Cooperation Treaty Application No. PCT/CN2011/081902, mailed Feb. 23, 2012, 5 pages (Continued)

*Primary Examiner* — Paul H Masur
(74) *Attorney, Agent, or Firm* — Slater & Matsil, L.L.P.

(57) ABSTRACT

A power control method and a base station are disclosed. The method includes obtaining, by a base station, $IN_{PUCCH}(i)$. The $IN_{PUCCH}(i)$ is an average interference noise power of a physical uplink control channel (PUCCH) carried by radio resources that are allocated by the base station at a subframe i. The base station sends a parameter $P_{0\_NOMINAL\_PUCCH}(i)$ for power control at the subframe i.

14 Claims, 4 Drawing Sheets

(56) References Cited

OTHER PUBLICATIONS

3rd Generation Partnership Project, "Technical Specification Group Radio Access Network; Evolved Universal Terrestrial Radio Access (E-UTRA); Physical Channels and Modulation (Release 9)," 3GPP TS 36.211, v9.1.0, Mar. 2010, 85 pages.

3rd Generation Partnership Project, "Technical Specification Group Radio Access Network; Evolved Universal Terrestrial Radio Access (E-UTRA); Physical Channels and Modulation (Release 9)," 3GPP TS 36.212, v9.3.0, Sep. 2010, 61 pages.

3rd Generation Partnership Project, "Technical Specification Group Radio Access Network; Evolved Universal Terrestrial Radio Access (E-UTRA); Physical Layer Procedures (Release 9)," 3GPP TS 36.213, v9.3.0, Sep. 2010, 80 pages.

Ericsson, "Uplink Power Control for E-UTRA—Range and Representation of P0," 3GPP TSG-RAN WG1 #51, R1-074850, Jeju, Korea, Nov. 5-9, 2007, 3 pages.

Extended European Search Report received in Application No. 11843307.7-1852, Applicant: Huawei Technologies Co., Ltd., mailed Mar. 21, 2013, 9 pages.

Chinese Search Report received in Application No. 201010561679.3 mailed Mar. 14, 2013, 2 pages.

\* cited by examiner

POWER CONTROL METHOD AND BASE STATION

This application is a continuation of International Application No. PCT/CN2011/081902, filed on Nov. 8, 2011, which claims priority to Chinese Patent Application No. 201010561679.3, filed on Nov. 26, 2010, both of which are hereby incorporated by reference in their entireties.

TECHNICAL FIELD

The present invention relates to the field of communication technologies, and in particular, to a power control method and a base station.

BACKGROUND

A physical uplink control channel (PUCCH, Physical Uplink Control Channel) of a long term evolution technology (LTE, Long Term Evolution) uses a code division multiple access (CDMA, Code Division Multiple Access) technology. Because the CDMA technology is a self-interference system, when co-channel interference reaches a certain degree, a success rate of demodulating information carried by the PUCCH may be affected. Increasing PUCCH transmit power of a user terminal (UE, User Equipment) is a method for increasing the success rate of PUCCH demodulation.

For example, the PUCCH transmit power of the UE at a subframe (Subframe) i is indicated by $P_{PUCCH}(i)$, where $P_{PUCCH}(i) = \min\{P_{CMAX}, P_{0\_PUCCH} + PL + h(n_{CQI}, n_{HARQ}) + \Delta_{F\_PUCCH}(F) + g(i)\}$. The $P_{CMAX}$ is maximum transmit power of the UE. The $P_{0\_PUCCH}$ is a received power level expected by a base station, and $P_{0\_PUCCH} = P_{0\_NOMINAL\_PUCCH} + P_{0\_UE\_PUCCH}$, where the $P_{0\_NOMINAL\_PUCCH}$ indicates a cell-specific received power level of the PUCCH expected by the base station, and the $P_{0\_UE\_PUCCH}$ is a power offset value relative to the $P_{0\_NOMINAL\_PUCCH}$. The PL is a downlink path loss value estimated by the UE. The $h(n_{CQI}, n_{HARQ})$ is a value decided by a PUCCH format, where $n_{CQI}$ is the number of information bits of a channel quality indicator (channel quality indicator, CQI), and $n_{HARQ}$ is the number of information bits of an HARQ. The $\Delta_{F\_PUCCH}(F)$ is a power offset value of a different PUCCH transmission format relative to a reference format (DCI FORMAT 1A). The g(i) is a calibration value of inner loop power control, and is used to compensate an error which is set for initial power of open loop power control, and $$g(i) = g(i-1) + \sum_{m=0}^{M-1} \delta_{PUCCH}(i - k_m),$$

where the $\delta_{PUCCH}$ is a transmit power control command (Transmit Power Control command, TPC command) on a subframe.

In the prior art, after receiving the $P_{0\_NOMINAL\_PUCCH}$, $P_{0\_UE\_PUCCH}$, and $\delta_{PUCCH}$, the UE may calculate the PUCCH transmit power at the subframe i by using the foregoing formula, but the PUCCH transmit power at the subframe i calculated by the UE is inaccurate, and thus an effect of suppressing network interference caused by increasing the PUCCH transmit power is not good.

SUMMARY OF THE INVENTION

According to one aspect, the present invention provides a power control method. A base station obtains $IN_{PUCCH}(i)$, where the $IN_{PUCCH}(i)$ is an average interference noise power of a physical uplink control channel (PUCCH) carried by radio resources that are allocated by the base station at a subframe I. The base station sends a parameter $P_{0\_NOMINAL\_PUCCH}(i)$ for power control at the subframe i. If a relative difference between the $IN_{PUCCH}(i)$ and a power reference value $IN_{PUCCH\_REF}$ is greater than a threshold $IN_{TH\_PUCCH}$, a value of the $P_{0\_NOMINAL\_PUCCH}(i)$ is a sum of $SINR_{0\_NOMINAL\_PUCCH}$ and $IN_{PUCCH}$ at the subframe i. The $SINR_{0\_NOMINAL\_PUCCH}$ is a first signal to interference plus noise ratio of the PUCCH obtained by the base station according to a lowest-class service used by a UE located at a cell edge and a first uplink control information format. Otherwise, the value of the $P_{0\_NOMINAL\_PUCCH}(i)$ is the same as a value of a parameter $P_{0\_NOMINAL\_PUCCH}(i-1)$ for the power control at a subframe i−1.

According to another aspect, the present invention provides a power control method. A base station obtains a bit error rate BER(i) of a physical uplink control channel (PUCCH) of a user equipment (UE) at a subframe i. The base station sends a transmit power control command $\delta_{PUCCH}(i-k_m)$, where a value of m ranges from 0 to M−1 and M is an integer greater than 1. A value of the $\delta'_{PUCCH}(i-k_m)$ is any one of the following. If the BER(i) is greater than a bit error rate reference value $BER_{PUCCH\_REF}$, $\delta'_{PUCCH}(i-k_m) = \delta_{PUCCH}(i-k_m) + \Delta SINR_{UE\_QCI}(i)$, where the $\Delta SINR_{UE\_QCI}(i)$ is a first signal to interference plus noise ratio offset used by the UE at the subframe i. If the BER(i) is smaller than the $BER_{PUCCH\_REF}$, $\delta'_{PUCCH}(i-k_m) = \delta_{PUCCH}(i-k_m) - \Delta SINR_{OFFSET}(i)$, where the $\Delta SINR_{OFFSET}(i)$ is a second signal to interference plus noise ratio offset used by the UE at the subframe i. If the BER(i) is equal to the $BER_{PUCCH\_REF}$, the value of the $\delta'_{PUCCH}(i-k_m)$ is the same as a value of the $\delta_{PUCCH}(i-k_m)$, where the $\delta_{PUCCH}(i-k_m)$ is a transmit power control command obtained by the base station at a subframe $i-k_m$.

According to another aspect, the present invention provides a base station. A first obtaining unit is configured to obtain $IN_{PUCCH}(i)$, where the $IN_{PUCCH}(i)$ is average interference noise power of a physical uplink control channel (PUCCH) carried by radio resources that are allocated by the base station at a subframe i. A first sending unit is configured to send a parameter $P_{0\_NOMINAL\_PUCCH}(i)$ for power control at the subframe i, where, if a relative difference between the $IN_{PUCCH}(i)$ and a power reference value $IN_{PUCCH\_REF}$ is greater than a threshold $N_{TH\_PUCCH}$, a value of the $P_{0\_NOMINAL\_PUCCH}(i)$ is a sum of $SINR_{0\_NOMINAL\_PUCCH}$ and $IN_{PUCCH}$ at the subframe i, where the $SINR_{0\_NOMINAL\_PUCCH}$ is a first signal to interference plus noise ratio of the PUCCH obtained by the first obtaining unit according to a lowest-class service used by a UE located at a cell edge and a first uplink control information format; otherwise, the value of the $P_{0\_NOMINAL\_PUCCH}(i)$ is the same as a value of a parameter $P_{0\_NOMINAL\_PUCCH}(i-1)$ for the power control at a subframe i−1.

According to another aspect, the present invention provides a base station. A second obtaining unit, configured to obtain a bit error rate BER(i) of a physical uplink control channel (PUCCH) of a user equipment (UE) at a subframe i. A second sending unit, configured to send a transmit power control command $\delta'_{PUCCH}(i-k_m)$, where a value of m ranges from 0 to M−1, M is an integer greater than 1, and a value of the $\delta'_{PUCCH}(i-k_m)$, is any one of the following:

if the BER(i) is greater than a bit error rate reference value $BER_{PUCCH\_REF}$, $\delta'_{PUCCH}(i-k_m) = \delta_{PUCCH}(i-k_m) +$ $\Delta SINR_{UE\_QCI}(i)$, where the $\Delta SINR_{UE\_QCI}(i)$ is a first signal to interference plus noise ratio offset used by the UE at the subframe i;

if the BER(i) is smaller than the $BER_{PUCCH\_REF}$, $\delta'_{PUCCH}(i-k_m) = \delta_{PUCCH}(i-k_m) - \Delta SINR_{OFFSET}(i)$, where the $\Delta SINR_{OFFSET}(i)$ is a second signal to interference plus noise ratio offset used by the UE at the subframe i; or if the BER(i) is equal to the $BER_{PUCCH\_REF}$, the value of the $\delta'_{PUCCH}(i-k_m)$ is the same as a value of the $\delta_{PUCCH}(i-k_m)$, where the $\delta_{PUCCH}(i-k_m)$ is a transmit power control command obtained by the second obtaining unit at a subframe $i-k_m$.

In the embodiments of the present invention, the base station may send a more accurate parameter to the UE, so that PUCCH transmit power calculated by the UE at the subframe i is more accurate, and network interference caused by increasing the PUCCH transmit power is further reduced.

DETAILED DESCRIPTION OF ILLUSTRATIVE EMBODIMENTS

The technical solutions in the embodiments of the present invention are hereinafter described clearly and completely with reference to the accompanying drawings in the embodiments of the present invention. Obviously, the described embodiments are only part of the embodiments of the present invention, rather than all of the embodiments of the present invention. All other embodiments derived by persons of ordinary skill in the art based on the embodiments of the present invention without making creative efforts shall fall within the scope of the present invention.

In the embodiments of the present invention, i is placed in brackets and used as a part of a parameter X, namely, in the form of X(i), indicating a case when the parameter X is at a subframe i. For example, $P_{PUCCH}$ indicates PUCCH transmit power of a UE, and $P_{PUCCH}(i)$ indicates the PUCCH transmit power of the UE at the subframe i. A base station in the embodiments of the present invention may be any access network device for controlling power of the UE, for example, an evolved NodeB (eNB, evolved Node base station) in an LTE system or LTE-Advance system.

Figure 1:
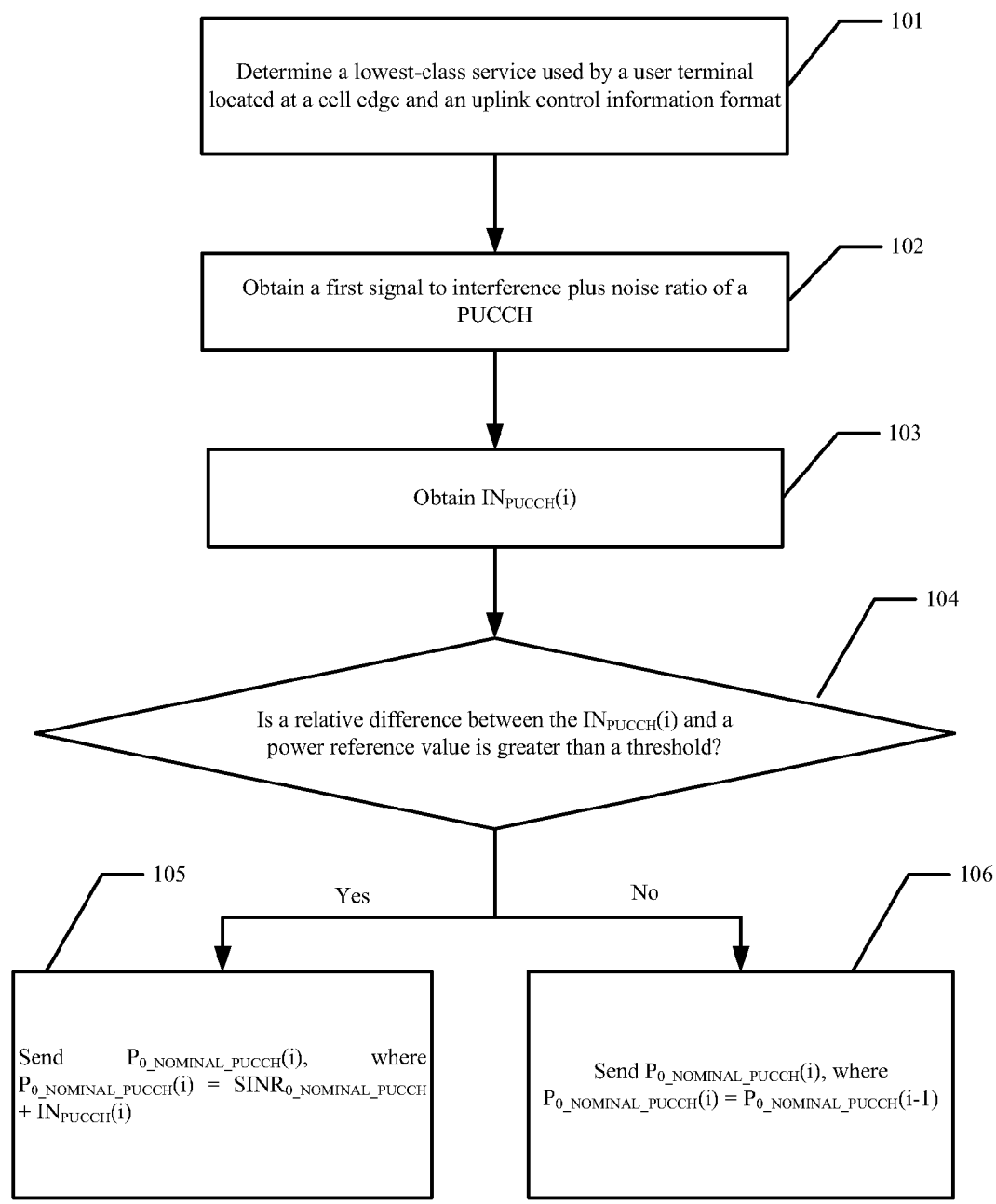
FIG. 1 is a schematic flowchart of a power control method according to an embodiment of the present invention.

Referring to FIG. 1, an embodiment of the present invention provides a power control method. In this embodiment, a base station may send a parameter related to a $P_{PUCCH}(i)$ of a UE to the UE in a cell under control of the base station, for example, $P_{0\_NOMINAL\_PUCCH}$ and $P_{0\_UE\_PUCCH}$. As compared with the prior art, the $P_{0\_NOMINAL\_PUCCH}$ sent by the base station to the UE is more accurate. Therefore, the UE obtains accurate $P_{0\_PUCCH}$ according to the accurate $P_{0\_NOMINAL\_PUCCH}$, so that the finally obtained $P_{PUCCH}(i)$ is more accurate. This embodiment may include the following steps.

101. A base station determines a lowest-class service used by a UE located at a cell edge and an uplink control information format (hereinafter referred to as a first uplink control information format) of a PUCCH corresponding to the lowest-class service used by the foregoing UE.

The lowest-class service used by the UE located at the cell edge may be set according to a market need, for example, VoIP, an Internet access, or other services determined by a telecom operator. The first uplink control information format is set according to a control signaling type carried on the PUCCH, and may be one of FORMAT 1a, FORMAT 1b, FORMAT 2, FORMAT 2a, and FORMAT 2b.

The base station may determine, according to a geographic location of the UE, whether the UE is located at the cell edge, or may determine, according to a radio channel condition, whether the UE is located at the cell edge, for example, determine the UE whose radio channel condition deteriorates to a certain degree in a network as a UE located at the cell edge. For example, in mobile communication, a UE located at and under 5% in a cumulative distribution function (CDF, Cumulative Distribution Function) curve is a UE located at the cell edge. If there are multiple UEs located at the cell edge, the base station may obtain the lowest-class service used by only one of the UEs and the first uplink control information format. Optionally, the UE selected by the base station is a UE at the lowest position in the CDF curve, that is, a UE with the worst channel condition.

102. The base station obtains a first signal to interference plus noise ratio $SINR_{0\_NOMINAL\_PUCCH}$ of the PUCCH according to the lowest-class service used by the UE located at the cell edge and the first uplink control information format.

The $SINR_{0\_NOMINAL\_PUCCH}$ is a signal to interference plus noise ratio that the base station expects the PUCCH, which uses the first uplink control information format, to reach in order to ensure quality of service of the lowest-class service used by the UE, and its unit may be dB. Those skilled in the art may understand that a service class may be indicated by a quality of service class identifier (QoS class identifier, QCI).

In this embodiment, the base station may generate the $SINR_{0\_NOMINAL\_PUCCH}$ according to the lowest-class service and first uplink control information format, so that the generated $SINR_{0\_NOMINAL\_PUCCH}$ corresponding to the foregoing lowest-class service satisfies a demodulation threshold requirement for demodulating feedback information (such as ACK or NACK) carried on the PUCCH of the first uplink control information format. Those skilled in the art may understand that different scenarios and/or different channel conditions affect a demodulation success rate, and that the corresponding demodulation threshold requirement may also be different. For example, a value of a demodulation threshold may be any one of 10 dB to 30 dB.

Optionally, if the base station periodically sends a parameter related to the $P_{PUCCH}(i)$ of the UE to the UE, that is, the UE updates the $P_{PUCCH}(i)$ according to an update period, the base station only needs to finish obtaining the first signal to interference plus noise ratio at a certain time before the next update period arrives.

103. The base station obtains $IN_{PUCCH}(i)$, namely, average interference noise power of a PUCCH carried by radio resources (RB, Radio Bearer) at a subframe i.

A unit of the $IN_{PUCCH}(i)$ may be dBm.

In this step, the RBs carrying the PUCCH include RBs carrying the PUCCH of the current uplink control information format.

104. The base station judges whether a relative difference between the $IN_{PUCCH}(i)$ and a power reference value $IN_{PUCCH\_REF}$ is greater than a threshold $IN_{TH\_PUCCH}$. If yes, step 105 is executed; if no, step 106 is executed.

A unit of the $IN_{PUCCH\_REF}$ and $IN_{TH\_PUCCH}$ may be dBm.

The power reference value $IN_{PUCCH\_REF}$ in this step may be a preset value of the base station, or may be a value determined by the base station according to the average interference noise power of the RBs carrying a PUCCH at a certain subframe of the UE.

In this step, the base station may preset the threshold $IN_{TH\_PUCCH}$, or may perform test estimation under a channel condition so as to obtain the $IN_{TH\_PUCCH}$. Those skilled in the art may understand that the value of the $IN_{TH\_PUCCH}$ obtained by the base station may be different under different channel conditions. For example, the value of the $IN_{TH\_PUCCH}$ is any one of −121 dBm to −91 dBm. By adjusting the value of the $IN_{TH\_PUCCH}$, an anti-interference capability of the UE may be enhanced when interference noise of the cell increases to a certain degree (namely, greater than a certain threshold), so that performance of the UE can be better ensured. In addition, when the interference noise of the cell is reduced to a certain degree, transmit power of each UE under the base station can be reduced, so that interference on a neighboring cell is reduced while the performance of the UE is ensured.

If $|IN_{PUCCH}(i)-IN_{PUCCH\_REF}|>IN_{TH\_PUCCH}$, the base station may learn that when an update period arrives, and if the currently measured $IN_{PUCCH}(i)$ changes notably relative to the reference IN value, then the base station executes step 105 to adjust $P_{0\_NOMINAL\_PUCCH}$. "||" in this embodiment indicates an absolute value.

If $|IN_{PUCCH}(i)-IN_{PUCCH\_REF}|<IN_{TH\_PUCCH}$, the base station may learn that, relative to a subframe i−1, the cell interference noise at the subframe i changes little, then the base station executes step 106 and keeps the $P_{0\_NOMINAL\_PUCCH}$ unchanged. In this way, the performance of the UE does not deteriorate in the case that the anti-interference capability of the UE does not change, and an interference condition of the whole network does not change.

105. The base station sends $P_{0\_NOMINAL\_PUCCH}(i)$ to the UE, namely, the parameter $P_{0\_NOMINAL\_PUCCH}$ of the UE at the subframe i. $P_{0\_NOMINAL\_PUCCH}(i)=$ $SINR_{0\_NOMINAL\_PUCCH}+IN_{PUCCH}(i)$.

Optionally, the base station sends the $P_{0\_NOMINAL\_PUCCH}(i)$ to all UEs in the cell through a broadcast channel.

Optionally, the base station further updates the power reference value $IN_{PUCCH\_REF}$ to the value of $IN_{PUCCH}(i)$, that is, the updated $IN_{PUCCH\_REF}=IN_{PUCCH}(i)$. Further, the updated $IN_{PUCCH\_REF}$ will be used by the base station in the next process of judging the PUCCH transmit power. For example, the base station may execute step 104 within each update period of the PUCCH transmit power. Assume that the base station changes the $IN_{PUCCH\_REF}$ used in the judging process to the value of $IN_{PUCCH}(i)$ after a previous judging process of step 104, the base station uses the changed $IN_{PUCCH\_REF}$ (namely, $IN_{PUCCH\_REF}$ with the value $IN_{PUCCH}(i)$) as the current power reference value in a next judging process of step 104.

If the value of the changed $IN_{PUCCH\_REF}$ greater than $IN_{PUCCH\_REF}$ is before the change, the base station increases the $IN_{PUCCH\_REF}$ by using this method, which is helpful for increasing the anti-interference capability of the UE at the next $IN_{PUCCH}(i)$ update period. If the value of the changed $IN_{PUCCH\_REF}$ is smaller than $IN_{PUCCH\_REF}$ before the change, the base station decreases the $IN_{PUCCH\_REF}$ by using this method, which is helpful for reducing network interference at the next $IN_{PUCCH}(i)$ update period.

By updating $IN_{PUCCH\_REF}$, the base station may make more accurate judgment in the subsequent process of determining a value of the $P_{0\_NOMINAL\_PUCCH}(i)$, so that the UE can obtain more accurate PUCCH(i) according to a more accurate parameter.

106. The base station sends the $P_{0\_NOMINAL\_PUCCH}(i)$ to the UE, where $P_{0\_NOMINAL\_PUCCH}(i)=P_{0\_NOMINAL\_PUCCH}(i-1)$, that is, a value of the $P_{0\_NOMINAL\_PUCCH}$ at the subframe i is the same as a value of the $P_{0\_NOMINAL\_PUCCH}$ at the subframe i−1.

Optionally, the base station sends the $P_{0\_NOMINAL\_PUCCH}(i)$ to all UEs in the cell through the broadcast channel.

In this embodiment, when the relative difference between the $IN_{PUCCH}(i)$ and the $IN_{PUCCH\_REF}$ is greater than the threshold, the base station may determine the $P_{0\_NOMINAL\_PUCCH}$ according to the $SINR_{0\_NOMINAL\_PUCCH}$ and $IN_{PUCCH}(i)$ and send the $P_{0\_NOMINAL\_PUCCH}$ to the UE. As compared with the prior art, the $P_{0\_NOMINAL\_PUCCH}(i)$ is more accurate. Therefore, the $P_{PUCCH}(i)$ obtained by the UE is more accurate, and reliability of signaling transmission can be ensured in the case that the PUCCH channel of each UE in the cell under control of the base station is based on code division multiplexing.

When this embodiment is applied in a scenario where the UE accesses a certain cell under control of the base station, the $P_{PUCCH}(i)$ determined by the UE=$\min\{P_{CMAX}, P_{0\_PUCCH}+PL+h(n_{CQI}, n_{HARQ})+\Delta_{F\_PUCCH}(F)\}$. Therefore, the UE determines accurate $P_{0\_PUCCH}$ according to the received accurate $P_{0\_NOMINAL\_PUCCH}$, and then performs accurate open loop power control of the PUCCH transmit power according to the foregoing formula.

Further, the PUCCH in this embodiment may carry the feedback information (signaling such as ACK and NACK), while the feedback information is relevant to downlink data carried on a physical downlink shared channel (Physical Downlink Share Channel, PDSCH) corresponding to the PUCCH. Therefore, the base station may increase the PUCCH transmit power of the UE when the cell interference increases, thereby ensuring correct decoding of the foregoing feedback information, and avoiding incorrect retransmission of the downlink data carried on the PDSCH. Because the base station increases the PUCCH transmit power of the UE based on the $SINR_{0\_NOMINAL\_PUCCH}$ in the foregoing process, the base station may maximally reduce the network interference while ensuring normal use of the lowest-class service used by the UE, where the UE is located at the cell edge, after increasing the PUCCH transmit power.

The difference between another embodiment of the present invention and the foregoing embodiment is that step 102 is changed to be executed between step 104 and step 105, that is, the base station executes steps 101, 103, and 104 sequentially, and then executes steps 102 and 105 sequentially according to a judging result of step 104, or executes step 106. The difference between another embodiment of the present invention and the foregoing embodiment is that steps 101 and 102 are changed to be executed between step 104 and step 105, that is, the base station executes steps 103 and 104 sequentially, and then executes steps 101, 102, and 105 sequentially according to the judging result of step 104, or executes step 106. In the two embodiments, when the base station judges that the relative difference between the $IN_{PUCCH}(i)$ and the $IN_{PUCCH\_REF}$ is not greater than the threshold, the step of obtaining the $IN_{PUCCH}(i)$ does not need to be executed, which may save power of the base station.

Those skilled in the art may understand that the base station may send the $P_{0\_NOMINAL\_PUCCH}$ for the UE to obtain the $P_{0\_PUCCH}$ regardless of an FDD system or a TDD system, thereby implementing the open loop power control. Therefore, the foregoing embodiments are applicable to both the FDD system and the TDD system.

Figure 2:
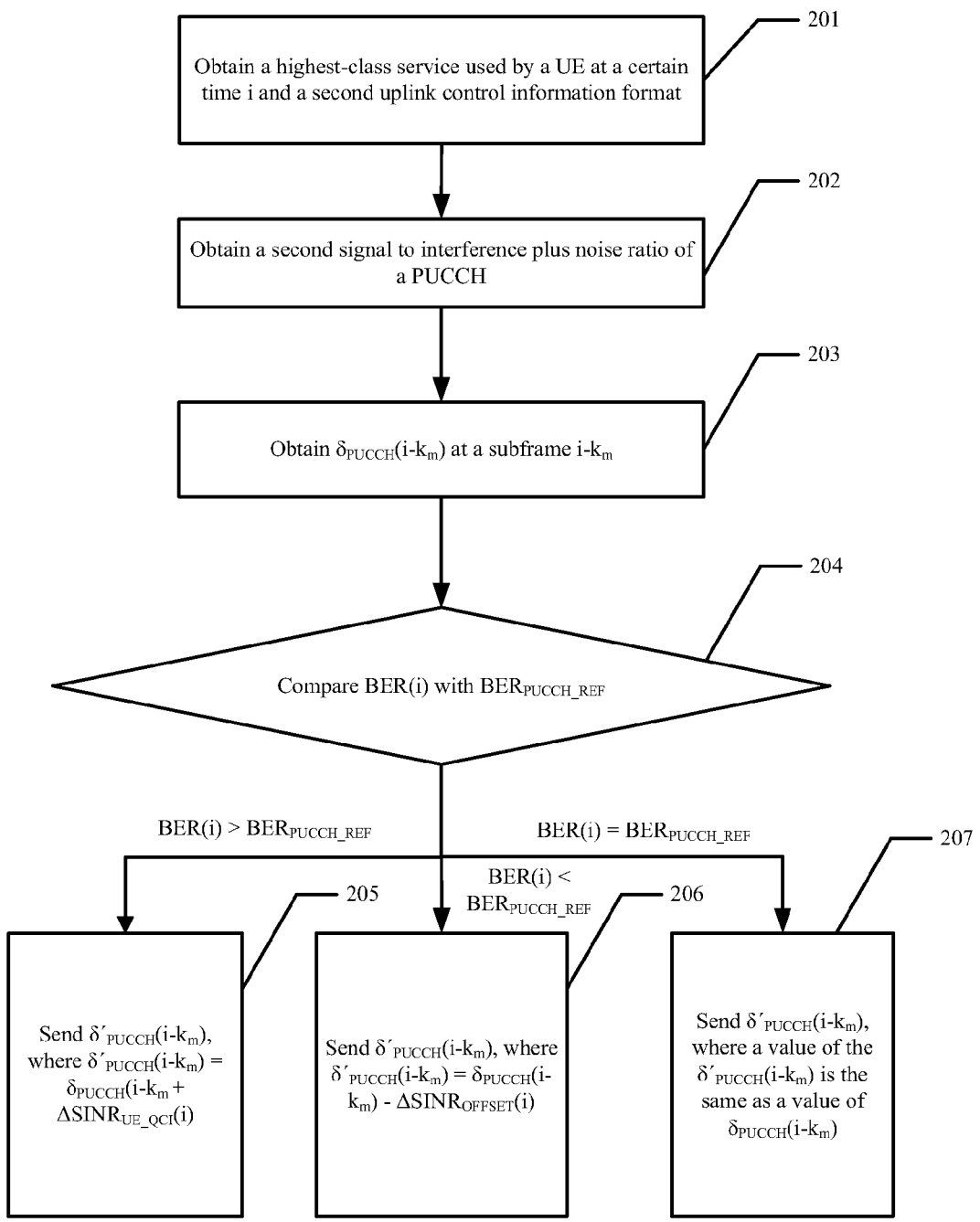
FIG. 2 is a schematic flowchart of a power control method according to another embodiment of the present invention.

Referring to FIG. 2, another embodiment of the present invention provides a power control method. In this embodiment, a base station may send a parameter related to the $P_{PUCCH}(i)$ of an online UE to the UE in a cell under control of the base station, for example, $P_{O\_NOMINAL\_PUCCH}$, $P_{O\_UE\_PUCCH}$, and $\delta_{PUCCH}$. According to the formula $$g(i) = g(i-1) + \sum_{m=0}^{M-1} \delta_{PUCCH}(i-k_m),$$

The UE obtains g(i). As compared with the prior art, the $\delta_{PUCCH}$ sent by the base station to the UE is more accurate. Therefore, the UE obtains the accurate g(i) according to the accurate $\delta_{PUCCH}$, so that the finally obtained $P_{PUCCH}(i)$ is more accurate. This embodiment may include the following steps.

201. A base station obtains a highest-class service used by a UE at a time i and an uplink control information format (hereinafter referred to as a second uplink control information format) of a PUCCH corresponding to the highest-class service used by the UE.

For example, the base station may use the prior art to obtain a terminal identifier of any online UE, the highest-class service used by the UE and its corresponding uplink control information format of the PUCCH. The uplink control information format of the PUCCH may be any one of PUCCH format 1a, PUCCH format 1b, PUCCH format 2, PUCCH format 2a, and PUCCH format 2b.

Optionally, the highest-class service used by the UE is a highest-class service used by the UE at a certain time. For example, if the UE begins to use a service at a certain time, while a class of the service is higher than those of other services being used by the UE, the base station may obtain the service and the uplink control information format of the PUCCH corresponding to the service.

202. The base station obtains a second signal to interference plus noise ratio $SINR_{0\_UE\_PUCCH\_MAX}(i)$ of the PUCCH according to the highest-class service used by the UE at the time i and the second uplink control information format.

The $SINR_{0\_UE\_PUCCH\_MAX}$ is a signal to interference plus noise ratio that the base station expects the PUCCH, which uses the second uplink control information format, to reach in order to ensure quality of service of the highest-class service used by the UE, and its unit may be dB.

Optionally, if the base station periodically sends a parameter related to a $P_{PUCCH}(i)$ of the UE to the UE, that is, the UE updates the $P_{PUCCH}(i)$ according to an update period, the base station only needs to finish obtaining the second signal to interference plus noise ratio at a certain time before a next update period arrives.

In this embodiment, the base station may generate $SINR_{0\_UE\_PUCCH\_MAX}$ according to the highest-class service and second uplink control information format, so that the generated $SINR_{0\_UE\_PUCCH\_MAX}$ corresponding to the foregoing highest-class service satisfies a demodulation threshold requirement for demodulating feedback information (such as ACK or NACK) carried on the PUCCH of the second uplink control information format. Those skilled in the art may understand that different scenarios and/or different channel conditions affect a demodulation success rate, and that the corresponding demodulation threshold requirement may also be different. For example, the value of a demodulation threshold may be any one of 10 dB to 30 dB.

203. The base station obtains a transmit power control command $\delta_{PUCCH}(i-k_m)$ at a subframe $i-k_m$, where a value of m ranges from 0 to M−1 (M is an integer greater than 1).

In this step, the base station obtains M transmit power control commands in total.

For example, in a frequency division duplex (FDD, Frequency Division Duplex) system, a value of $k_0$ may be 4, and a value of M may be 1. In a time division duplex (TDD, Time Division Duplex) system, reference may be made to the following Table 1 for a downlink association set index (Downlink association set index) K formed of $k_m$.

TABLE 1

| Uplink-Downlink Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

204. The base station compares BER(i) with $BER_{PUCCH\_REF}$, where the BER(i) indicates a bit error rate at a subframe i, and the $BER_{PUCCH\_REF}$ is a bit error rate reference value. If the BER(i) is greater than the $BER_{PUCCH\_REF}$, step 205 is executed; if the BER (i) at the subframe i is smaller than the $BER_{PUCCH\_REF}$, step 206 is executed; if the BER (i) at the subframe is equal to the $BER_{PUCCH\_REF}$, step 207 is executed.

The BER(i) may be a bit error rate of the PUCCH obtained by the base station according to the prior art when the UE is at the subframe i. The BER(i) and $BER_{PUCCH\_REF}$ may be percentages.

In this step, the base station may preset the $BER_{PUCCH\_REF}$, or may perform test estimation under a channel condition so as to obtain the $BER_{PUCCH\_REF}$. For example, the base station sets the $BER_{PUCCH\_REF}$ according to the demodulation success rate of feedback data carried on the PUCCH, where a service of a physical downlink shared channel (PDSCH) corresponding to the foregoing feedback data is the highest-class service. Those skilled in the art may understand that different scenarios and/or different channel conditions affect the demodulation success rate, and that a value of the $BER_{PUCCH\_REF}$ obtained by the base station may be different. For example, the value of the $BER_{PUCCH\_RE}$ is any one of 0.1% to 15%.

If $BER(i) > BER_{PUCCH\_REF}$, the base station may learn that PUCCH transmit power of the UE needs to be increased to reduce the BER. For example, the base station executes step 205.

If $BER(i) < BER_{PUCCH\_REF}$, the base station may learn that to reduce network interference, the PUCCH transmit power of the UE needs to be reduced. For example, the base station executes step 206.

If $BER(i) = BER_{PUCCH\_REF}$, the base station may learn that an anti-interference capability and performance of the UE may be maintained without changing the PUCCH transmit power of the UE. For example, the base station executes step 207.

205. The base station sends $\delta_{PUCCH}(i-k_m)$ to the UE, where $\delta'_{PUCCH}(i-k_m) = \delta_{PUCCH}(i-k_m) + \Delta SINR_{UE\_QCI}$ (i), where $\Delta SINR_{UE\_QCI}(i)$ indicates a first signal to interference plus noise ratio offset used by the UE at the subframe i and is used to increase the transmit power.

Optionally, $\Delta SINR_{UE\_QCI}(i) = SINR_{0\_UE\_PUCCH\_MAX}(i) - SINR_{0\_NOMINAL\_PUCCH}$. $SINR_{0\_NOMINAL\_PUCCH}$ here may refer to the description about the $SINR_{0\_NOMINAL\_PUCCH}$ in the foregoing embodiment. For example, the base station may obtain the $SINR_{0\_NOMINAL\_PUCCH}$ by executing steps 101 to 102 in the foregoing embodiment, which is not repeatedly described here. The $\Delta SINR_{UE\_QCI}(i)$ may indicate a relative offset between a signal to interference plus noise ratio that the base station expects the PUCCH, which uses the second uplink control information format, to reach in order to ensure the quality of service of the highest-class service used by the UE, and a signal to interference plus noise ratio that the base station expects the PUCCH, which uses a first uplink control information format, to reach in order to ensure quality of service of the lowest-class service used by the UE. Therefore, the offset can reflect needs of services of different classes. Therefore, while increasing the PUCCH transmit power of the UE, the base station may ensure reliability of signaling transmission in the case that the PUCCH channel of each UE in the cell under control of the base station is based on code division multiplexing.

206. The base station sends $\delta'_{PUCCH}(i-k_m)$ to the UE, where $\delta'_{PUCCH}(i-k_m) = \delta_{PUCCH}(i-k_m) - \Delta SINR_{OFFSET}$ (i), where $\Delta SINR_{OFFSET}(i)$ indicates a second signal to interference plus noise ratio offset used by the UE at the subframe i and is used to reduce the transmit power.

Optionally, the base station sets an initial value of the $\Delta SINR_{OFFSET}$, and performs adjustment according to an actual condition, and uses an adjusted $\Delta SINR_{OFFSET}$ when executing PUCCH power control (for example, executing step 206) next time. For example, the initial value of the $\Delta SINR_{OFFSET}$ may be 1 dB, and the base station performs adjustment by using 1 dB as a step. Optionally, adjusting of the $\Delta SINR_{OFFSET}$ by the base station may reflect fast increase and slow decrease, that is, a step used by a value of $\Delta SINR_{UE\_QCI}$ when the base station increases the transmit power is greater than a step used by a value of $\Delta SINR_{OFFSET}$ when the base station reduces the transmit power, for example, the former is 2 dB, and the latter is 1 dB.

In this step, the base station may preset the $\Delta SINR_{OFFSET}$, or may perform the test estimation under the channel condition so as to obtain the $\Delta SINR_{OFFSET}$. Those skilled in the art may understand that the $\Delta SINR_{OFFSET}$ obtained by the base station through estimation according to different scenarios and/or different channel conditions is different. By adjusting the value of the $\Delta SINR_{OFFSET}$, transmit power of a corresponding UE under the base station may be reduced when the PUCCH BER meets a requirement, thereby reducing interference on a neighboring cell while ensuring the performance of the UE.

207. The base station sends $\delta'_{PUCCH}(i-k_m)$ to the UE, where a value of $\delta'_{PUCCH}(i-k_m)$ is the same as a value of $\delta_{PUCCH}(i-k_m)$.

In this embodiment, because the base station may use a manner of sending the $\delta_{PUCCH}(i-k_m)$ in the prior art to send the $\delta'_{PUCCH}(i-k_m)$, the base station in this step actually sends the $\delta_{PUCCH}(i-k_m)$ obtained in step 203 to the UE.

Optionally, in any one of steps 205 to 207 in this embodiment, the base station sends the $\delta'_{PUCCH}(i-k_m)$ to the UE through a physical downlink control channel (Physical Downlink Control Channel, PDCCH).

In this embodiment, the base station first adjusts the obtained $\delta_{PUCCH}(i-k_m)$ and then sends the $\delta'_{PUCCH}(i-k_m)$ obtained through adjustment to the UE. Because the $\delta'_{PUCCH}(i-k_m)$ is more accurate than the $\delta_{PUCCH}(i-k_m)$ obtained by the base station, the $P_{PUCCH}(i)$ obtained by the UE is more accurate. Therefore, the reliability of signaling transmission can be ensured in the case that the PUCCH channel of each UE in the cell under the control of the base station is based on the code division multiplexing.

When this embodiment is applied in a scenario where the UE keeps online, the UE may perform open loop power control of the PUCCH transmit power by using the prior art, and perform closed-loop power control of the PUCCH transmit power by using the method provided by this embodiment. In the closed-loop power control, the $P_{PUCCH}(i)$ determined by the UE = $\min\{P_{CMAX}, P_{0\_PUCCH} + PL + h(H_{CQI}, n_{HARQ}) + \Delta_{F\_PUCCH}(F) + g(i)\}$. Therefore, the UE determines accurate $g(i)$ according to the received accurate $\delta_{PUCCH}$, thereby performing accurate closed-loop power control of the PUCCH transmit power according to the foregoing formula.

Those skilled in the art may understand that the base station can send the $\delta_{PUCCH}$ for the UE to obtain the $g(i)$ regardless of the FDD system or the TDD system, thus implementing the closed-loop power control. Therefore, the foregoing embodiment is applicable to both the FDD system and the TDD system.

Another embodiment of the present invention provides a power control method. In this embodiment, a base station may send a parameter related to $P_{PUCCH}(i)$ of an online UE to the UE in a cell under control of the base station, for example, $P_{0\_NOMINAL\_PUCCH}$, $P_{0\_UE\_PUCCH}$, and $\delta_{PUCCH}$. By using the method provided by the foregoing embodiment of the present invention, the base station adjusts the $P_{0\_NOMINAL\_PUCCH}$ (such as steps 101 to 105 or 106) and $\delta_{PUCCH}$ (such as steps 201 to 205 or 206 or 207), so that the $P_{0\_NOMINAL\_PUCCH}$ and $\delta_{PUCCH}$ sent by the base station to the UE are more accurate. Therefore, the UE obtains accurate $P_{0\_PUCCH}$ according to the accurate $P_{0\_NOMINAL\_PUCCH}$, and obtains accurate $g(i)$ according to the accurate $\delta_{PUCCH}$, thereby making the finally obtained $P_{PUCCH}(i)$ more accurate. In this embodiment, before sending the $P_{0\_NOMINAL\_PUCCH}$ and $\delta_{PUCCH}$ to the UE, the base station only needs to respectively complete steps 101 to 105 or 106, and steps 201 to 205 or 206 or 207, where an execution sequence of the foregoing steps does not need to be limited.

Figure 3:
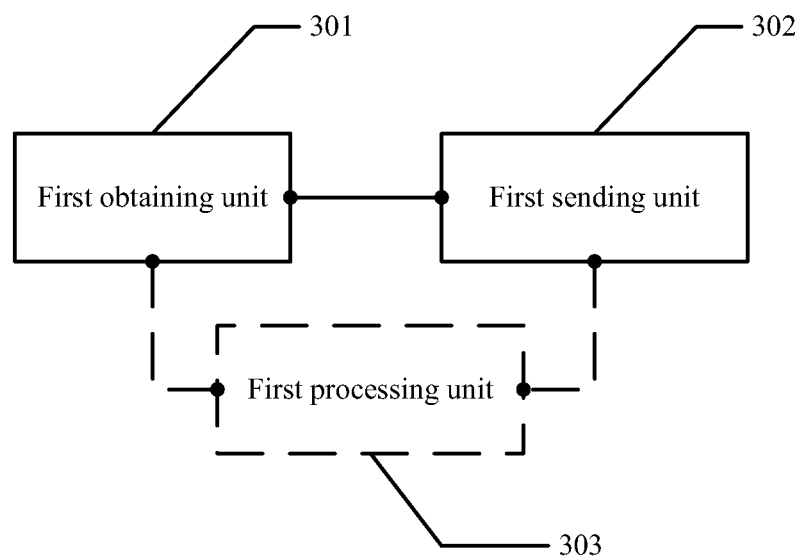
FIG. 3 is a schematic structural diagram of a base station according to another embodiment of the present invention.

Referring to FIG. 3, another embodiment of the present invention provides a base station 30. The base station 30 may include a first obtaining unit 301 and a first sending unit 302. The first obtaining unit 301 is configured to obtain $IN_{PUCCH}(i)$, where the $IN_{PUCCH}(i)$ is average interference noise power of a physical uplink control channel (PUCCH) carried by radio resources that are allocated by the base station at a subframe i. The first sending unit 302 is configured to send a parameter $P_{0\_NOMINAL\_PUCCH}(i)$ for power control at the subframe i, where, if a relative difference between the $IN_{PUCCH}(i)$ obtained by the first obtaining unit 301 and a power reference value $IN_{PUCCH\_REF}$ is greater than a threshold $IN_{TH\_PUCCH}$, a value of the $P_{0\_NOMINAL\_PUCCH}(i)$ is a sum of $SINR_{0\_NOMINAL\_PUCCH}$ and $IN_{PUCCH}$ at the subframe i, where the $SINR_{0\_NOMINAL\_PUCCH}$ may be a first signal to interference plus noise ratio of the PUCCH, where the ratio is obtained by the first obtaining unit 301 according to a lowest-class service used by a UE located at a cell edge and a first uplink control information format; otherwise, the value of the $P_{0\_NOMINAL\_PUCCH}(i)$ is the same as a value of a parameter $P_{0\_NOMINAL\_PUCCH}(i-1)$ for the power control at a subframe i−1.

Optionally, the base station 30 further includes: a first processing unit 303, configured to judge whether the relative difference between the $IN_{PUCCH}(i)$ obtained by the first obtaining unit 301 and the power reference value $IN_{PUCCH\_REF}$ is greater than the threshold $IN_{TH\_PUCCH}$, and provides a judging result to the first sending unit 302. Accordingly, the first sending unit 302 sends the $P_{0\_NOMINAL\_PUCCH}(i)$ according to the judging result provided by the first processing unit 303.

Optionally, the first uplink control information format is set according to a control signaling type carried on the PUCCH, and may be one of FORMAT 1a, FORMAT 1b, FORMAT 2, FORMAT 2a, and FORMAT 2b.

Optionally, the $SINR_{0\_NOMINAL\_PUCCH}$ is a signal to interference plus noise ratio that the base station expects the PUCCH, which uses the first uplink control information format, to reach in order to ensure quality of the lowest-class service used by the UE.

The base station in this embodiment is applied in a scenario where the UE accesses a certain cell under control of the base station, and in this case, $P_{PUCCH}(i)$ determined by the UE=$\min\{P_{CMAX}, P_{0\_PUCCH}+PL+h(n_{CQI}, n_{HARQ})+\Delta_{F\_PUCCH}(F)\}$. Therefore, the UE determines accurate $P_{0\_PUCCH}$ according to the accurate $P_{0\_NOMINAL\_PUCCH}$ received from the first sending unit 302 and performs accurate open loop power control of PUCCH transmit power according to the foregoing formula.

The base station in this embodiment may be used in the method provided by the embodiment shown in FIG. 1, that is, executes the actions implemented by the base station in the method. Reference may also be made to the description in the method for the parameters and scenario used by the base station in this embodiment, which are not repeatedly described here. In addition, the base station in the embodiment is applicable to both an FDD system and a TDD system.

Figure 4:
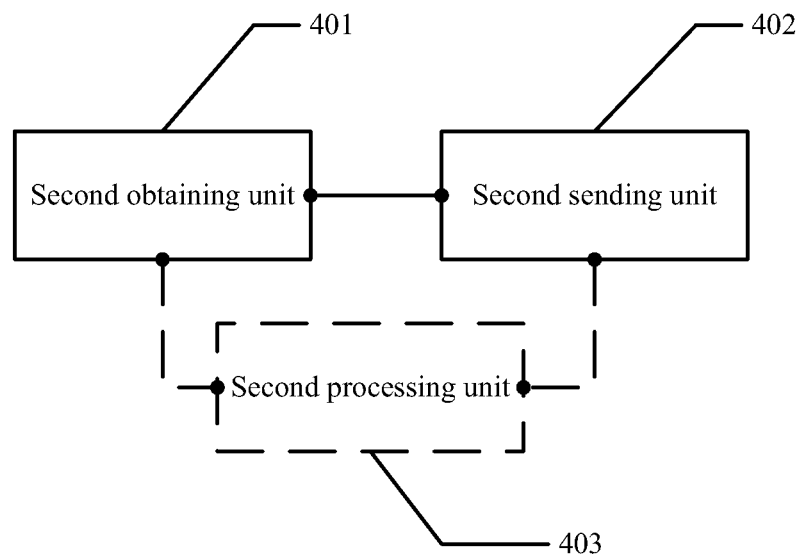
FIG. 4 is a schematic structural diagram of a base station according to another embodiment of the present invention.

Referring to FIG. 4, another embodiment of the present invention provides a base station 40. The base station 40 may include a second obtaining unit 401 and a second sending unit 402. The second obtaining unit 401 is configured to obtain a bit error rate BER(i) of a physical uplink control channel (PUCCH) of a user equipment (UE) at a subframe i. The second sending unit 402 is configured to send a transmit power control command $\delta'_{PUCCH}(i-k_m)$, where a value of m ranges from 0 to M−1, and M is an integer greater than 1. Optionally, a value of $\delta'_{PUCCH}(i-k_m)$ is any one of the following:

if the BER(i) obtained by the second obtaining unit 401 is greater than a bit error rate reference value $BER_{PUCCH\_REF}$, $\delta'_{PUCCH}(i-k_m)=\delta_{PUCCH}(i-k_m)+\Delta SINR_{UE\_QCI}$, where the $\Delta SINR_{UE\_QCI}(i)$ is a first signal to interference plus noise ratio offset used by the UE at the subframe i; or if the BER(i) obtained by the second obtaining unit 401 is smaller than the $BER_{PUCCH\_REF}$, $\delta'_{PUCCH}(i-k_m)=\delta_{PUCCH}(i-k_m)-\Delta SINR_{OFFSET}$, where the $\Delta SINR_{OFFSET}(i)$ is a second signal to interference plus noise ratio offset used by the UE at the subframe i; or if the BER(i) obtained by the second obtaining unit 401 is equal to the $BER_{PUCCH\_REF}$, the value of the $\delta'_{PUCCH}(i-k_m)$ is the same as a value of the $\delta_{PUCCH}(i-k_m)$, where the $\delta_{PUCCH}(i-k_m)$ is a transmit power control command obtained by the second obtaining unit 401 at a subframe $i-k_m$.

Optionally, $\Delta SINR_{UE\_QCI}(i)=SINR_{0\_UE\_PUCCH\_MAX}(i)-SINR_{0\_NOMINAL\_PUCCH}$. Reference may be made to the description about the $SINR_{0\_NOMINAL\_PUCCH}$ in the embodiment shown in FIG. 3 for the $SINR_{0\_NOMINAL\_PUCCH}$, which is not repeatedly described here. The $SINR_{0\_UE\_PUCCH\_MAX}(i)$ is a second signal to interference plus noise ratio obtained by the second obtaining unit 401 according to a highest-class service used by the UE at a time i and a second uplink control information format, and $SINR_{0\_UE\_PUCCH\_MAX}$ is a signal to interference plus noise ratio that the base station expects the PUCCH, which uses the second uplink control information format, to reach in order to ensure quality of service of the highest-class service used by the UE.

Optionally, the second obtaining unit 401 is further configured to obtain the highest-class service used by the UE at the time i and the second uplink control information format, for example, the second obtaining unit 401 obtains the foregoing highest-class service and second uplink control information format when the UE begins to use the highest-class service.

The base station in this embodiment is applied in a scenario where the UE keeps online. In this case, the UE may perform open loop power control of PUCCH transmit power by using the prior art, and perform closed-loop power control of the PUCCH transmit power by using the method provided by this embodiment. In the closed-loop power control, $P_{PUCCH}(i)$ determined by the UE=$\min\{P_{CMAX}, P_{0\_PUCCH}+PL+h(n_{CQI}, n_{HARQ})+\Delta_{F\_PUCCH}(F)+g(i)\}$. Therefore, the UE determines accurate g(i) according to accurate $\delta_{PUCCH}$ sent by the second sending unit 402, thereby performing accurate closed-loop power control of the PUCCH transmit power according to the foregoing formula.

Optionally, the base station 40 further includes: a second processing unit 403, configured to compare the BER(i) obtained by the second obtaining unit 401 with the bit error reference value $BER_{PUCCH\_REF}$, and provide a judging result to the second sending unit 402. Accordingly, the second sending unit 402 sends the PUCCH $(i-k_m)$ according to the judging result provided by the second processing unit 403.

The base station in this embodiment may be used in the method provided by the embodiment shown in FIG. 2, that is, executes the actions implemented by the base station in the method. Reference may also be made to the description in the method for the parameters and scenario used by the base station in this embodiment, which are not repeatedly described here. In addition, the base station in this embodiment is applicable to both an FDD system and a TDD system.

Figure 5:
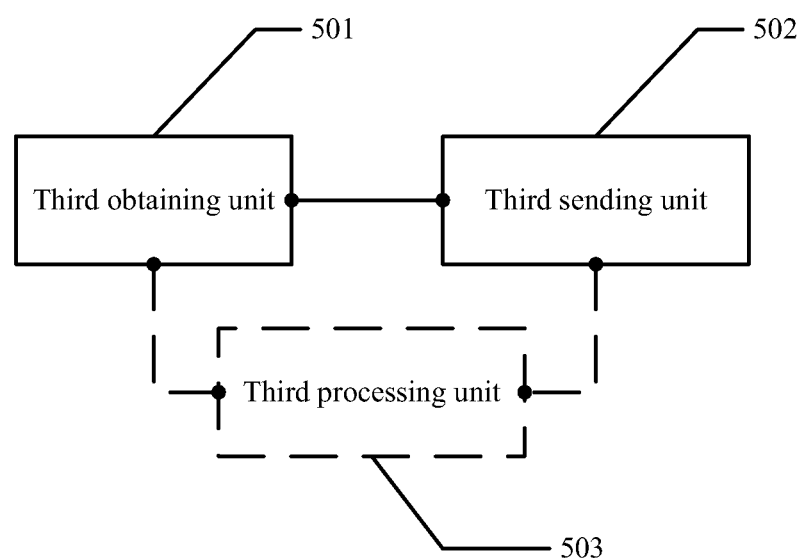
FIG. 5 is a schematic structural diagram of a base station according to another embodiment of the present invention.

Referring to FIG. 5, another embodiment of the present invention provides a base station 50, where the base station 50 may include a third obtaining unit 501 and a third sending unit 502. The third obtaining unit 501 includes the first obtaining unit 301 in the base station 30 and the second obtaining unit 401 in the base station 40 provided by the foregoing embodiments, and the third sending unit 502 includes the first sending unit 302 in the base station 30 and the second sending unit 402 in the base station 40 provided by the foregoing embodiments.

Optionally, the base station 50 further includes a third processing unit 503. The third processing unit 503 includes the first processing unit 303 in the base station 30 and the second processing unit 403 in the base station 40 provided by the foregoing embodiments.

$P_{0\_NOMINAL\_PUCCH}$ and $\delta_{PUCCH}$ sent by the base station provided by the embodiment to a UE are more accurate. Therefore, the UE obtains accurate P0_PUCCH according to the accurate $P_{0\_NOMINAL\_PUCCH}$, and obtains accurate g(i) according to the accurate $\delta_{PUCCH}$, thereby making finally obtained PPUCCH(i) more accurate. The base station in this embodiment is applicable to both an FDD system and a TDD system.

Persons of ordinary skill in the art may understand that all or part of the steps of the methods according to the foregoing embodiments may be implemented by a program instructing relevant hardware. The program may be stored in a computer readable storage medium, where the medium may include: a ROM, a RAM, a magnetic disk, a compact disk, and so on.

The foregoing is a detailed description of a power control method of an LTE PUCCH and a base station provided by the embodiments of the present invention. The principle and implementation manner of the present invention are described with reference to specific embodiments, and the foregoing embodiments are only intended to help understand the methods and a core idea of the present invention. Meanwhile, with respect to the specific implementation manner and the application scope of the present invention, modifications may be made by persons of ordinary skill in the art according to the idea of the present invention. To sum up, the content of the specification shall not be construed as a limitation on the present invention.

What is claimed is:

1. A power control method, comprising:
   obtaining, by a base station, $IN_{PUCCH}(i)$, wherein the $IN_{PUCCH}(i)$ is an average interference noise power of a physical uplink control channel (PUCCH) carried by radio resources that are allocated by the base station at a subframe i; and
   sending, by the base station, a parameter $P_{0\_NOMINAL\_PUCCH}(i)$ for power control at the subframe i, wherein if a relative difference between the $IN_{PUCCH}(i)$ and a power reference value $IN_{PUCCH\_REF}$ is greater than a threshold $IN_{TH\_PUCCH}$, a value of the $P_{0\_NOMINAL\_PUCCH}(i)$ is a sum of $SINR_{0\_NOMINAL\_PUCCH}$ and $IN_{PUCCH}$ at the subframe i, wherein the $SINR_{0\_NOMINAL\_PUCCH}$ is a first signal to interference plus noise ratio of the PUCCH obtained by the base station according to a lowest-class service used by a UE located at a cell edge and a first uplink control information format; and wherein if the relative difference between the $IN_{PUCCH}(i)$ and the power reference value $IN_{PUCCH\_REF}$ is not greater than the threshold $IN_{TH\_PUCCH}$, the value of the $P_{0\_NOMINAL\_PUCCH}(i)$ is the same as a value of a parameter $P_{0\_NOMINAL\_PUCCH}(i-1)$ for the power control at a subframe i−1.

2. The method according to claim 1, wherein the first uplink control information format is any one of the following formats: format 1A, format 1B, format 2, format 2A, and format 2B.

3. The method according to claim 1, wherein the $SINR_{0\_NOMINAL\_PUCCH}$ is a signal to interference plus noise ratio that the base station expects the PUCCH, which uses the first uplink control information format, to reach in order to ensure quality of the lowest-class service used by the UE.

4. The method according to claim 1, further comprising:
   sending, by the base station, a transmit power control command $\delta'_{PUCCH}(i-k_m)$, wherein a value of m ranges from 0 to M−1, M is an integer greater than 1;
   wherein if a bit error rate BER(i) of the PUCCH of the UE at the subframe i, wherein the BER(i) is obtained by the base station, is greater than a bit error rate reference value $BER_{PUCCH\_REF}$, $\delta'_{PUCCH}(i-k_m)=\delta_{PUCCH}(i-k_m)+\Delta SINR_{UE\_QCI}(i)$, wherein the $\Delta SINR_{UE\_QCI}(i)$ is a first signal to interference plus noise ratio offset used by the UE at the subframe i;
   wherein if the BER(i) is smaller than the $BER_{PUCCH\_REF}$, $\delta'_{PUCCH}(i-k_m)=\delta_{PUCCH}(i-k_m)-\Delta SINR_{OFFSET}(i)$, wherein the $\Delta SINR_{OFFSET}(i)$ is a second signal to interference plus noise ratio offset used by the UE at the subframe i;
   wherein if the BER(i) is equal to the $BER_{PUCCH\_REF}$, the value of the $\delta'_{PUCCH}(i-k_m)$ is the same as a value of the $\delta_{PUCCH}(i-k_m)$, wherein the $\delta_{PUCCH}(i-k_m)$ is a transmit power control command obtained by the base station at a subframe $i-k_m$.

5. The method according to claim 4, wherein a highest-class service used by the UE and a second uplink control information format are obtained by the base station when the UE begins to use the highest-class service.

6. The method according to claim 4, wherein:
   a value of the $\Delta SINR_{UE\_QCI}(i)$ is a difference between $SINR_{0\_UE\_PUCCH\_MAX}(i)$ and $SINR_{0\_NOMINAL\_PUCCH}$; and
   the $SINR_{0\_UE\_PUCCH\_MAX}(i)$ is a second signal to interference plus noise ratio obtained by the base station according to a highest-class service used by the UE at a time i and a second uplink control information format.

7. The method according to claim 6, wherein the $SINR_{0\_UE\_PUCCH\_MAX}$ is a signal to interference plus noise ratio that the base station expects the PUCCH, which uses the second uplink control information format, to reach in order to ensure quality of service of the highest-class service used by the UE.

8. A base station, comprising:
   a first obtaining unit, configured to obtain $IN_{PUCCH}(i)$, wherein the $IN_{PUCCH}(i)$ is an average interference noise power of a physical uplink control channel (PUCCH) carried by radio resources that are allocated by the base station at a subframe i; and
   a first sending unit, configured to send a parameter $P_{0\_NOMINAL\_PUCCH}(i)$ for power control at the subframe i, wherein, if a relative difference between the $IN_{PUCCH}(i)$ and a power reference value $IN_{PUCCH\_REF}$ is greater than a threshold $IN_{TH\_PUCCH}$, a value of the $P_{0\_NOMINAL\_PUCCH}(i)$ is a sum of $SINR_{0\_NOMINAL\_PUCCH}$ and $IN_{PUCCH}$ at the subframe i, wherein the $SINR_{0\_NOMINAL\_PUCCH}$ is a first signal to interference plus noise ratio of the PUCCH obtained by the first obtaining unit according to a lowest-class service used by a UE located at a cell edge and a first uplink control information format; and wherein, if the relative difference between the $IN_{PUCCH}(i)$ and the power reference value $IN_{PUCCH\_REF}$ is not greater than the threshold $IN_{TH\_PUCCH}$, the value of the $P_{0\_NOMINAL\_PUCCH}(i)$ is the same as a value of a parameter $P_{0\_NOMINAL\_PUCCH}(i-1)$ for the power control at a subframe i−1.

9. The base station according to claim 8, wherein the first uplink control information format is any one of the following formats: format 1A, format 1B, format 2, format 2A, and format 2B.

10. The base station according to claim 8, wherein the $SINR_{0\_NOMINAL\_PUCCH}$ is a signal to interference plus noise ratio that the base station expects the PUCCH, which uses the first uplink control information format, to reach in order to ensure quality of the lowest-class service used by the UE.

11. The base station according to claim 8, wherein:

the first sending unit is further configured to send a transmit power control command $\delta'_{PUCCH}(i-k_m)$, wherein a value of m ranges from 0 to M−1, M is an integer greater than 1;

wherein if a bit error rate BER(i) of the PUCCH of the UE at the subframe i, wherein the BER(i) is obtained by the first obtaining unit, is greater than a bit error rate reference value $BER_{PUCCH\_REF}$, $\delta'_{PUCCH}(i-k_m)=\delta_{PUCCH}(i-k_m)+\Delta SINR_{UE\_QCI}(i)$, wherein the $\Delta SINR_{UE\_QCI}(i)$ is a first signal to interference plus noise ratio offset used by the UE at the subframe i;

wherein if the BER(i) is smaller than the $BER_{PUCCH\_REF}$, $\delta'_{PUCCH}(i-k_m)=\delta_{PUCCH}(i-k_m)-\Delta SINR_{OFFSET}(i)$, wherein the $\Delta SINR_{OFFSET}(i)$ is a second signal to interference plus noise ratio offset used by the UE at the subframe i; and wherein if the BER(i) is equal to the $BER_{PUCCH\_REF}$, the value of the $\delta'_{PUCCH}(i-k_m)$ is the same as a value of the $\delta_{PUCCH}(i-k_m)$, wherein the $\delta_{PUCCH}(i-k_m)$ is a transmit power control command obtained by the first obtaining unit at a subframe $i-k_m$.

12. The base station according to claim 11, wherein a highest-class service used by the UE and a second uplink control information format are obtained by the base station when the UE begins to use the highest-class service.

13. The base station according to claim 11, wherein:

a value of the $\Delta SINR_{UE\_QCI}(i)$ is a difference between $SINR_{0\_UE\_PUCCH\_MAX}(i)$ and the $SINR_{0\_NOMINAL\_PUCCH}$; and the $SINR_{0\_UE\_PUCCH\_MAX}(i)$ is a second signal to interference plus noise ratio obtained by the base station according to a highest-class service used by the UE at a time i and a second uplink control information format.

14. The base station according to claim 13, wherein the $SINR_{0\_UE\_PUCCH\_MAX}$ is a signal to interference plus noise ratio that the base station expects the PUCCH, which uses the second uplink control information format, to reach in order to ensure quality of service of the highest-class service used by the UE.

* * * * *